Patented Jan. 15, 1924.

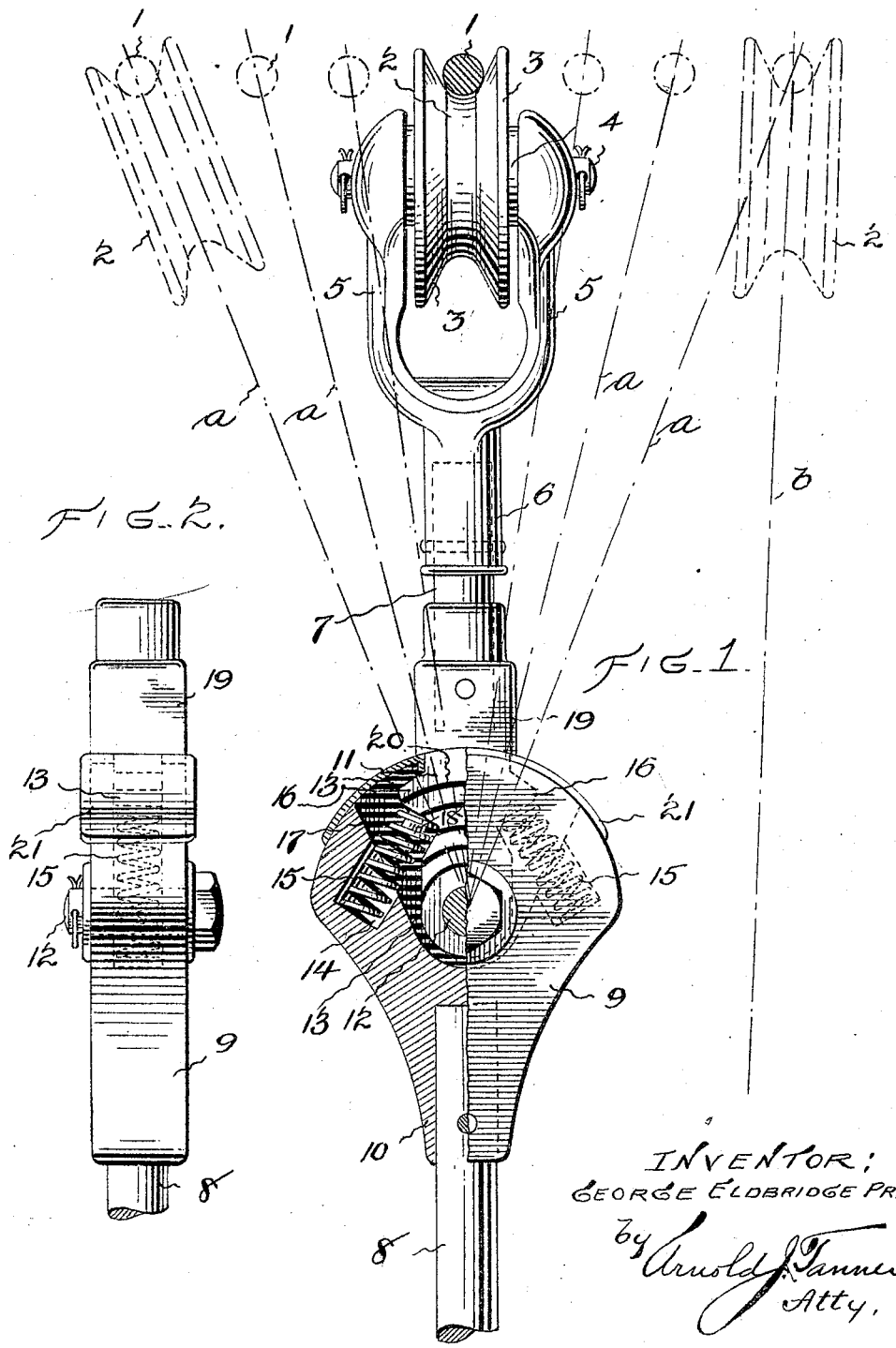

1,480,835

UNITED STATES PATENT OFFICE.

GEORGE ELDBRIDGE PRICE, OF NEW HAVEN, CONNECTICUT.

TROLLEY HEAD AND SUPPORT THEREFOR.

Application filed February 17, 1922. Serial No. 537,149.

*To all whom it may concern:*

Be it known that I, GEORGE ELDBRIDGE PRICE, a citizen of the United States, and resident of New Haven, in the county of New Haven and State of Connecticut, have invented certain new and useful Improvements in Trolley-Heads and Supports Therefor, of which the following is a specification.

The present invention relates to trolley heads or electric current collectors and consists more particularly in providing a supporting connection therefor which will permit the collector when in service to assume varying angular or radial positions independently of the trolley pole and thus ensuring that said collector will be constantly held in close contact with the trolley wire or electric current conductor and thereby the liability of the collector leaving the trolley wire at curves or irregularities in the track is entirely eliminated.

Heretofore it has been proposed to provide swivelling trolley-heads or a pivoted support therefor, the object being to obviate the above stated defects, but prior to this invention, the means proposed or employed for this purpose have usually proved to be either inefficient or they are not capable of being readily applied under prevailing conditions, especially to the standardized type of trolley head and support therefor now commonly employed in electric railway service.

According to the present invention, a pivoted support or connection, of a simple design and efficient in operation is provided for any suitable trolley-head and which latter preferably may be of a standard type and such a trolley-head, together with the improved support therefor, is described hereinafter with reference to the accompanying drawings wherein—

Figure 1 is a front elevation partly in section illustrating the trolley-head and the improved support therefor, and Figure 2 is a side elevation of the support alone.

Referring to the aforesaid drawings, 1 represents the overhead trolley-wire usually supported in a central position over the track, but at curves, depending upon the radius thereof, more or less deflection from the central position is apt to occur as shown for example by the broken line positions of the wire. The trolley wheel 2 having flanges 3, with inclined walls 3', engages the trolley wire in close contact and said wheel is provided with suitable bearings 4, in the harp 5. This harp 5 terminates into a socket 6 in which is secured a connecting rod 7 and which rod in the present instance is the equivalent of the end of the trolley pole 8 to which the trolley harp is secured directly when the improved support or connection is not interposed therebetween.

The improved support comprises the head or body 9 having a socket 10 into which the end of the trolley pole 8 is fitted and secured. A member 11 is pivotally mounted on shaft 12 within said head 9 and to allow limited oscillating or radial movement of the pivoted member 11, said body is recessed as designated by the numeral 13. Angularly disposed pockets 14 are provided in said recessed part of the head to receive and retain therein compression springs 15. As stated before, said member 11 is pivoted on shaft 12 and projections 16 meeting the side walls 17 of the recess 13, serve as stops to limit the movement of the pivoted member 11. Posts 18 on the underside of the projections 16 serve to prevent displacement of the springs 15. These springs are located one on each side of the pivoted member 11 and exert an equalizing force so as to maintain the trolley harp in a central position and also to oppose a too sensitive movement of the trolley harp into radial positions indicated by the broken line *a*.

The pivoted member 11 is provided with the socket 19 and this socket receives the free end of the connecting rod 7 which is secured therein and by these means the trolley harp or head is connected to the pivoted supporting and connecting means provided therefor.

The mechanical connection of the trolley harp carrying the collector wheel with the supporting means, is such that the electrical connection is in no way interfered with and to minimize friction, resulting from the rubbing of the pivoted member against the side walls of the head 9, grooves 20 filled with graphite as a lubricant are provided. Furthermore, to prevent accumulation of dust and grit within the recess 13 of the head 9, a dust cover or plate 21 is mounted on and secured in a suitable manner to the pivoted member 11 so as to travel therewith and thus effectually close said recess in all positions of said member.

It will be understood the trolley-head or current collector in general use is carried on the end of a trolley pole and this pole is mounted on a pivotal base located near the end of the car and by means of this pivotal mounting of the trolley pole, the pole itself is permitted to have an angular or radial movement for example as indicated by the broken line $b$ of Figure 1. It will also be understood that the trolley wheel does not leave the trolley wire at curves only because of the slight deflection of the trolley wire from a central position. Another cause, and frequently the main cause of the trolley wheel leaving the wire, is that when travelling around a curve in the track, the car-body has a tendency to sway and the swaying movement is proportional to the momentum of the car. The trolley pole base being carried on the car-body naturally the swaying movement thereof changes the relative position of the trolley pole and with it the trolley wheel, with respect to the trolley wire. Provision is commonly made so that the pole and trolley wheel will assume radial positions as for example shown by broken line $b$ of the drawings, but the radial movement is obtained from a center which is constituted by the trolley base. In practice it has been found that since the trolley pole is usually of considerable length, at least 10 feet long, the action thereof to bring the trolley wheel into the most effective radial position is not at times quick enough to prevent the trolley wheel leaving the trolley wire. Furthermore, because of the long radius, viz; the length of the trolley pole, the angular deflection of the trolley wheel is frequently not sufficient to ensure that the wheel will not run off the wire.

According to the present invention, the pivotal center for the trolley wheel to radiate from is brought close thereto thus greatly shortening the radius and thereby permitting quick responsive action, so as to instantly bring the wheel into a more effective angular position with comparatively little radial movement.

The improved support and connection of the trolley wheel permits quick self-adjustment of the wheel into radial positions to meet curves or irregularities in the track. When the car is running on a straight track the centralizing springs which impart an equalizing force on opposite sides of the pivoted member will maintain the trolley wheel in the normal or straight position, and since said springs offer more or less resistance, according to their tension, the trolley wheel and support are restrained from having radial or vibrating movement that might be so sensitive as to become a defect.

I claim—

In combination with a trolley pole carrying a trolley harp at the free end thereof, an intermediate support and connection for said harp providing for radial movement of said harp independently of said pole, and said support and connection comprising a head capable of being secured to said pole, said head having a recess therein, a pivoted member mounted within said recess, said member having means for securing said harp thereto, a dust cover or plate carried by said pivoted member moving therewith and serving to constantly cover said recess, and springs located within said recess for controlling the movement of said member.

Signed at New Haven, in the county of New Haven and State of Connecticut, this 16th day of February, A. D., 1922.

G. ELDBRIDGE PRICE.